United States Patent [19]

Terunuma

[11] Patent Number: 5,528,335
[45] Date of Patent: Jun. 18, 1996

[54] BATTERY CHECK DEVICE FOR A CAMERA

[75] Inventor: Hiroshi Terunuma, Yachiyo, Japan

[73] Assignee: Nikon Corporation, Tokyo, Japan

[21] Appl. No.: 311,033

[22] Filed: Sep. 26, 1994

[30]   Foreign Application Priority Data

Sep. 24, 1993   [JP]   Japan .................................. 5-258936

[51] Int. Cl.⁶ ................................ G03B 7/26; H02J 1/00
[52] U.S. Cl. ............................................. 354/484; 307/39
[58] Field of Search ................................... 354/468, 484; 307/39, 38

[56]   References Cited

U.S. PATENT DOCUMENTS 4,458,996   7/1984   Harigaya et al. ................... 354/484 X
4,469,990   9/1984   Maruyama et al. ................. 315/241 P Primary Examiner—W. B. Perkey

[57]   ABSTRACT

A battery check device, suitable for use in a camera, for reliably checking the essential capacity of a battery power source without affecting the voltage recovery of the battery power source after a long period of non-use. The battery check device monitors a starting switch, for example, a main switch or a release button, with a timer circuit and compares a switch interval between a previous time the starting switch was set ON and a present time the starting switch is set ON with a predetermined time. When the switch interval is within the predetermined time, a battery check circuit checks the power supply capacity of the battery power source using a light load circuit. When the interval is not within the predetermined time, the battery check circuit checks the power supply capacity of the battery using a heavy load circuit.

11 Claims, 2 Drawing Sheets

BATTERY CHECK DEVICE FOR A CAMERA

BACKGROUND OF THE INVENTION

1. Field of the Invention

The present invention relates to a battery check device for performing a check of the voltage of a battery power source supplying power to a device, such as a camera or other device using a battery power source, at the time of use of the device.

2. Description of the Related Art

Battery check circuits for cameras are known which perform a voltage check of a built-in battery power source at the time of camera use. The battery check is performed, for example, by a main switch of the camera or other switch which is set ON when a camera release button is depressed. If the voltage of the battery power source is determined to be above a battery check voltage, the operation of the camera proceeds to the next sequence of camera actions. However, if the voltage of the battery power source is determined to be below the battery check voltage, the camera is set to an inactive state.

When the known battery check circuits read the battery voltage at a battery check time, a load placed on the battery causes the battery voltage to decrease. If the battery voltage read at the battery check time is above some constant value of voltage (i.e., above the battery check voltage) a satisfactory battery check indication is given. The battery power source for the camera has the characteristic that the battery voltage recovers after a period of time. When the battery has not been used for a long period and a normal battery check is performed, the battery voltage is above the battery check voltage; however, when performing photography plural times using the battery, a problem arises in that the battery voltage ends up below the battery check voltage causing an unsatisfactory battery check indication. In particular, when performing strobe photography, because the consumption of battery current is very large, the above-described phenomenon occurs.

SUMMARY OF THE INVENTION

Accordingly, it is an object of the present invention to provide a battery check device which can reliably check the effective capacity of a battery.

It is a further object of the present invention to provide a battery check device wherein the voltage recovery of a battery power source is unaffected by a long period of non-use.

Objects and advantages of the present invention will be set forth in the description which follows, and, in part, will be obvious from the description, or may be learned by practice of the invention.

The above objects are attained in accordance with the present invention by providing a battery check device including a starting switch, such as a main switch or a release button half-depression switch, and a timer circuit measuring a switch interval between a previous time the starting switch was set ON and a present time the starting switch is set ON. A control circuit compares the measured switch interval with a previously set predetermined time, which is approximately the time required to restore the battery power supply voltage after use of the battery power supply. If the switch interval is within the predetermined time, a battery check circuit performs a battery check with the battery connected to a light load circuit as the battery power supply current load. However, if the switch interval exceeds the predetermined time, the battery check circuit performs a battery check with the battery connected to a heavy load circuit as the battery power supply current load. In accordance with the present invention, the essential power supply capacity of a battery power supply is checked by performing a battery check in a state in which the voltage recovery of the battery power supply has been impeded.

BRIEF DESCRIPTION OF THE DRAWINGS

These and other objects and advantages of the present invention will become apparent and more readily appreciated from the following description of the preferred embodiments taken in conjunction with the accompanying drawings, of which.

DESCRIPTION OF THE PREFERRED EMBODIMENTS

Figure 1:
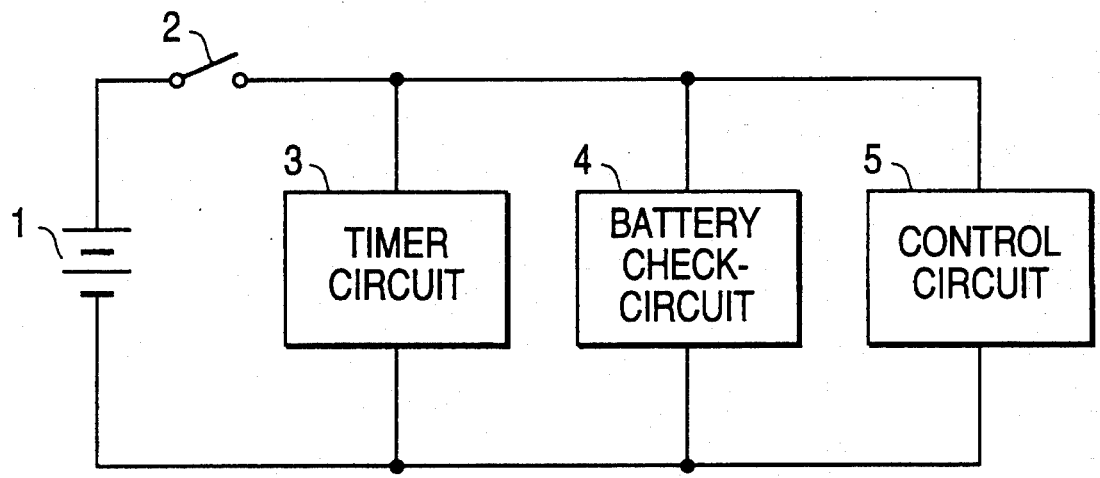
FIG. 1 is a block diagram of a battery check device, suitable for use in a camera, in accordance with a preferred embodiment of the present invention.

Reference will now be made in detail to the preferred embodiments of the present invention, examples of which are illustrated in the accompanying drawings, wherein like reference numerals refer to the same or similar elements throughout.

FIG. 1 is a block diagram of a battery check device, suitable for use in a camera, in accordance with a preferred embodiment of the present invention. As shown in FIG. 1, a battery 1, which may be, for example, an alkaline battery, a manganese battery or similar type of battery power source, is built into a camera (not shown in the figure) and used as a power source for the camera. A starting switch 2, which may be, for example, a main switch, a release button half-depression switch, or similar type of switch, is arranged in the camera and is set ON when camera operations are performed. A timer circuit 3, which may be built into a data imprinting device (not shown in the figure), is arranged in the camera, and performs date/time measurement, timing and related functions. A battery check circuit 4 checks the power supply capacity of the battery 1, and includes a changeover switch (not shown) which connects a light load circuit or a heavy load circuit to the battery 1 depending on the position of the changeover switch. A control circuit 5 performs control of the operation of the timer circuit 3, the battery check circuit 4, and other camera circuitry. The control circuit 5 includes memory circuits for storing data, etc., a memory rewriting circuit, a comparison determination circuit and the like.

Figure 2:
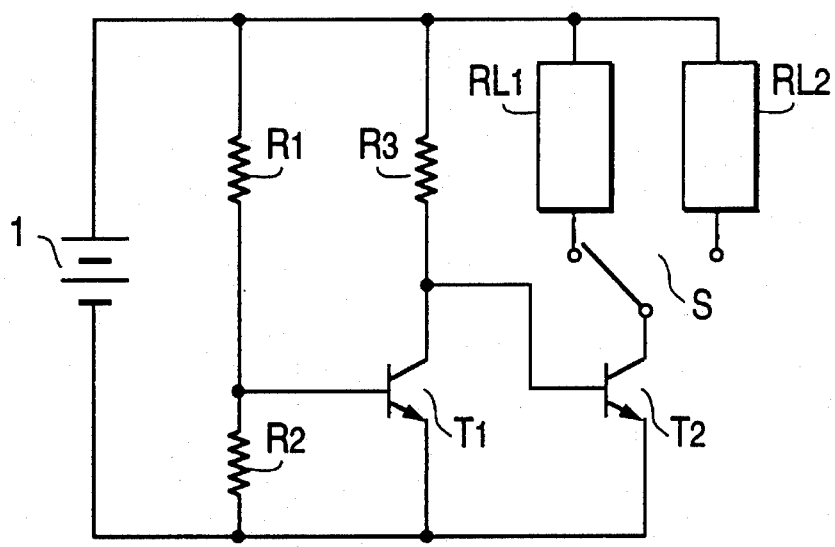
FIG. 2 is a circuit diagram of the battery check circuit shown in FIG. 1.

FIG. 2 is a circuit diagram of the battery check circuit 4 shown in FIG. 1. As seen in FIG. 2, a resistor $R_1$ and a resistor $R_2$ are connected in series between the (+) line and (−) line of the battery 1 having a voltage E. A transistor $T_1$ is connected by its base to the junction point of the resistor $R_1$ and the resistor $R_2$. The emitter of transistor $T_1$ is connected to the (−) line of battery 1, and the collector of transistor $T_1$ is connected to the (+) line of battery 1 via a resistor $R_3$. A transistor $T_2$ is connected by its base to the collector of the transistor $T_1$. The emitter of transistor $T_2$ is connected to the (−) line of battery 1, and the collector of transistor $T_2$ is connected to the (+) line of battery 1 via a light load circuit $RL_1$ or a heavy load circuit $RL_2$. The connection of the light load circuit $RL_1$ or the heavy load circuit $RL_2$ to the (+) line of battery 1 is selected by a selection switch S. The light load circuit $RL_1$ comprises, for example, an auto focus (AF) light projection element, a LED, a resistor or similar load element. The heavy load circuit $RL_2$ comprises, for example, a charging capacitor of an electronic flash element, a winder for winding film, or similar load element.

The battery check circuit 4 having the configuration shown in FIG. 2 will operate such that, if the battery 1 is not exhausted, when the voltage $\{R_2/(R_1+R_2) \times E\}$ divided by the resistor $R_1$ and resistor $R_2$ is greater than the threshold level of the transistor $T_1$ (normally about 0.6 V), i.e., the battery voltage E is above the battery check voltage, the transistor $T_1$ conducts. Because the input voltage to the base of the transistor $T_2$ is the saturation voltage between the collector and emitter of the transistor $T_1$ (normally below about 0.3 V), the transistor $T_2$ does not conduct, and accordingly, current does not pass through the light load circuit $RL_1$ or the heavy load circuit $RL_2$.

However, if the battery 1 is exhausted, when the voltage $\{R_2/(R_1+R_2) \times E\}$ divided by the resistor $R_1$ and resistor $R_2$ is smaller than the threshold level of the transistor $T_1$ (i.e., the battery voltage E is below the battery check voltage), the transistor $T_1$ becomes inoperative, current passes through the transistor $T_2$ via the resistor $R_3$, and the transistor $T_2$ conducts. As a result, current flows through the light load circuit $RL_1$ or the heavy load circuit $RL_2$ depending upon the circuit selected by the selection switch S, and the load on the battery becomes light or heavy corresponding to the position of the selection switch.

Accordingly, by suitably adjusting the value(s) of the resistor $R_1$ and/or the resistor $R_2$ such that the light load circuit $RL_1$ or the heavy load circuit $RL_2$ is connected to the battery check circuit 4 when the power source voltage of the battery 1 has fallen below a fixed value previously set as the battery check voltage, the voltage recovery of the battery 1 is impeded as the demand on the battery 1 increases.

Figure 3:
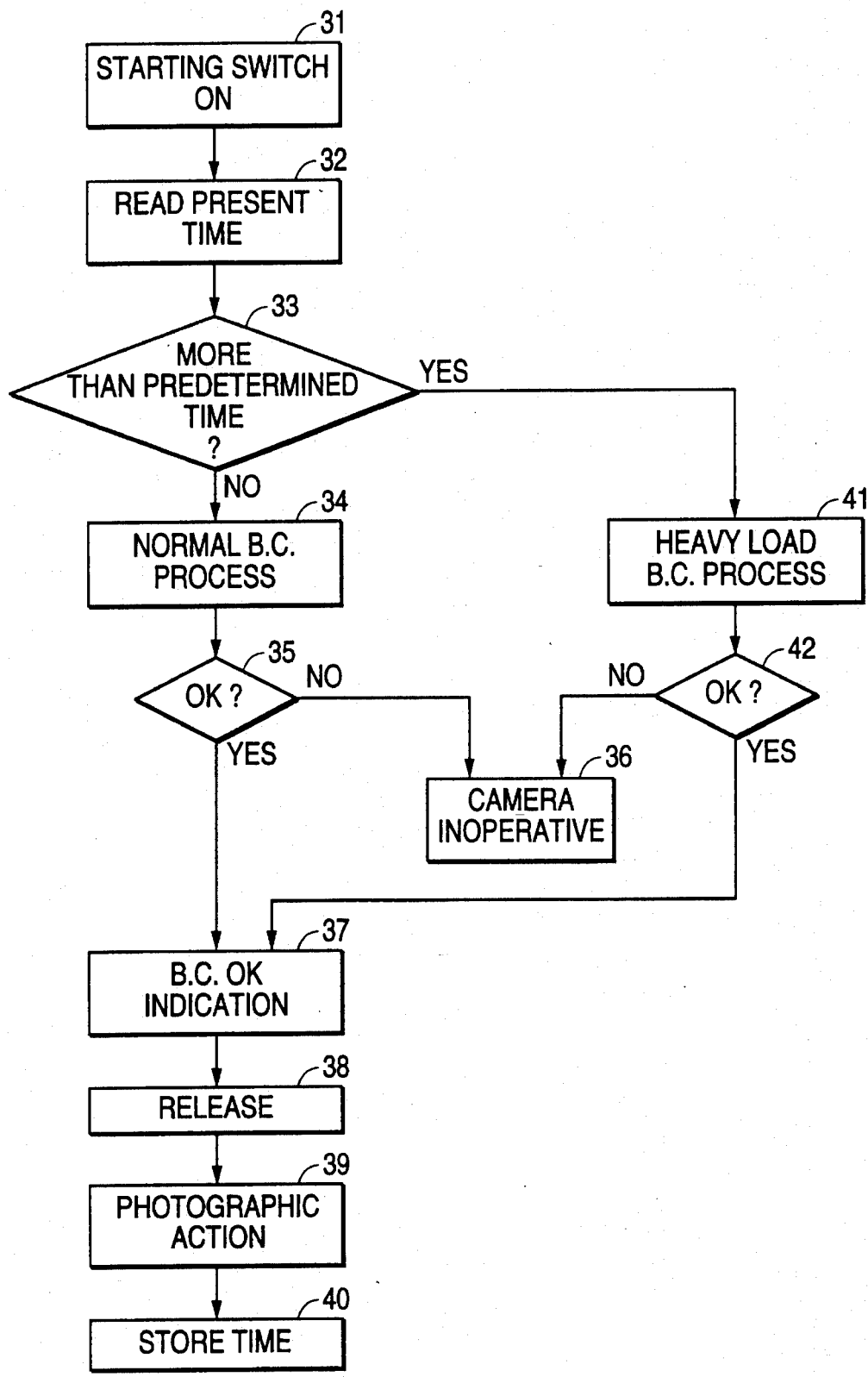
FIG. 3 is a flow chart showing a process for performing a battery check with a battery check device in accordance with a preferred embodiment of the present invention.

FIG. 3 is a flow chart showing a process for performing a battery check with a battery check device in accordance with a preferred embodiment of the present invention. First, when it is detected that the starting switch 2 has been set ON (step 31), the control circuit 5 reads the present time (step 32) from the timer circuit 3 in the data imprinting device. A comparison is performed (step 33) between a predetermined time, previously stored in the control circuit 5, and a measured switch interval. The predetermined time set in control circuit 5 may be, for example, the approximate time until the power supply voltage of the battery 1 recovers (for example, one day). The switch interval is a time difference between the time when the starting switch 2 was previously set ON and the time when the starting switch 2 has presently been set ON.

If the switch interval is within the set predetermined time, the control circuit 5 changes the selection switch S of the battery check circuit 4 to select the light load circuit $RL_1$, and a normal battery check (B.C.) process is performed (step 34). Thus, when the switch interval is within the set predetermined time, since the current load on the battery 1 has been changed to the light load circuit $RL_1$ by switching the selection switch S, the unnecessary exhaustion of the battery 1 can be prevented. If during the battery check process (step 34) the battery 1 voltage is determined to be below the battery check voltage (step 35), the camera is made inoperative (step 36).

However, if the battery 1 voltage is determined to be above the battery check voltage a "battery OK" display is performed using, for example, a LED or the like (step 37), and a release operation is awaited. When the release operation is performed (step 38), the photographic action of the camera commences (step 39). The time is then stored in the control circuit 5 (step 40), and the stored time data is used as the time when the starting switch 2 was previously turned ON during a time comparison (step 33) for the next battery check operation.

In step 33, when the result of the time comparison indicates that the switch interval is greater than the predetermined time, the selection switch S of the battery check circuit 4 is switched to the heavy load circuit $RL_2$, a greater current flows than during the normal battery check process of step 34, and performing a battery check (step 41) greatly decreases the voltage and impedes voltage recovery of the battery 1. If the battery 1 voltage is determined (step 42) to be below the battery check voltage, the camera is made inoperative (step 36). If the battery 1 voltage is above the battery check voltage, a "battery OK" display is performed (step 37).

Therefore, the battery check device in accordance with the present invention allows the load quantity connected to the battery 1 to be changed to a heavy load circuit $RL_2$ when the switch interval exceeds the predetermined time. When performing photography and the number of photographs taken is large, it is possible to change from the heavy load circuit $RL_2$ as a load to the normal light load circuit $RL_1$ when performing a battery check. For example, when performing continuous photography, because a battery check can be performed for the initial dozens of exposures using the heavy load circuit $RL_2$, and a battery check can be performed for the last number of exposures using the light load circuit $RL_1$, the present invention is very effective during continuous photography.

Further, in accordance with the embodiment of the present invention, since a charging capacitor causing an electronic flash device to generate light may be used as the heavy load circuit $RL_2$ imparting a current load to the battery 1, the charging capacitor becomes charged at the time of battery check and it becomes unnecessary to purposely charge the capacitor at the time of photography using the electronic flash device. As a result, the battery power source is not exhausted and, when charging is necessary at the time of photography, a short charging time for the charging capacitor is adequate, and the drain on the battery can be made small. Furthermore, chances for photography are not lost, and similar advantageous effects are obtained.

Although the preferred embodiment of the invention has been described with respect to the predetermined time set to approximately the time until the power supply voltage of the battery 1 recovers, for example, one day, the predetermined time may vary. For example, the predetermined time may differ according to the degree of exhaustion of the battery 1, and accordingly may be suitably set to a number of minutes, a number of hours, a number of days, a number of weeks, a number of months, etc., as required.

Further, although the preferred embodiment of the present invention has been described with respect to performing a battery check using the heavy load circuit $RL_2$ when the switch interval exceeds the predetermined time, the battery check at this time may be performed by using as the battery check voltage a voltage higher than the normal battery check voltage used when performing battery check with the light load circuit $RL_1$.

Furthermore, although the preferred embodiment of the invention has been described with respect to a camera having a battery check device, the battery check device in accordance with the present invention can, of course, be applied as a battery check device for various battery powered devices, such as a tape recorder, a rechargeable type television set, or similar battery powered devices.

According to the embodiments for the battery check device of the present invention, by connecting a light load or heavy load to a battery power source depending on the stage of the recovery of the battery supply voltage of a battery power source, advantageously, the battery power source can be used for a long period or the action of a device using the battery power source can be reliably inhibited.

Although preferred embodiments of the invention have been shown and described, it will be appreciated by those skilled in the art that changes may be made in these embodiments without departing from the principles and spirit of the invention, the scope of which is defined in the claims and their equivalents.

What is claimed is:

1. A battery check device for checking a voltage of a battery, comprising:

a switch;

a timer monitoring a switch interval between a previous time the switch is in an ON state and a present time the switch is in an ON state;

a battery check circuit, including a first load and a second load, to check a voltage level of the battery;

a control circuit storing a predetermined time, comparing the predetermined time with the monitored switch interval, and connecting one of the first load and the second load to the battery, according to the comparison, during a check of a voltage level of the battery with the battery check circuit.

2. A battery check device as recited in claim 1, wherein the battery check circuit includes a selection switch connecting one of the first load and the second load to the battery, and the control circuit controls a position of the selection switch to connect the first load to the battery when the switch interval is within the predetermined time and to connect the second load to the battery when the switch interval exceeds the predetermined time.

3. A battery check device as recited in claim 1, wherein the battery check circuit compares a battery voltage with a battery check voltage to determine whether the battery voltage is adequate.

4. A battery check device as recited in claim 3, wherein the battery check device is used in a camera and the operation of the camera is inhibited when the battery voltage is below the battery check voltage.

5. A battery check device to check a voltage of a battery power source supplying power to a device, comprising:

a switch;

a timer monitoring a switch interval between a previous time the switch is in an ON state and a present time the switch is in an ON state;

a battery check circuit comparing a battery check voltage with a battery voltage and inhibiting operation of the device when the battery voltage is below the battery check voltage, the battery check circuit including:

a light load circuit, a heavy load circuit, and a selection switch connecting one of the light load circuit and the heavy load circuit to the battery, wherein the light load circuit and the heavy load circuit are electric current loads of the battery power source; and a control circuit storing a predetermined time, and comparing the monitored switch interval with the predetermined time, the predetermined time indicating an approximate time until the power supply voltage of the battery power source has recovered, wherein the control circuit controls a position of the selection switch to connect the light load circuit to the battery to perform a battery check when the switch interval is within the predetermined time, and controls a position of the selection switch to connect the heavy load circuit to the battery to perform a battery check when the switch interval exceeds the predetermined time.

6. A battery check device as recited in claim 5, further comprising an electronic flash having a main capacitor, and wherein the heavy load circuit is a main capacitor of the electronic flash.

7. A battery check device as recited in claim 5, wherein a battery check voltage to perform a battery check under heavy load is a higher voltage than a battery check voltage to perform a battery check under light load.

8. A battery check circuit for checking a voltage of a battery, comprising:

a first transistor connected to the battery, conducting when the battery voltage is greater than a battery check voltage and not conducting when the battery voltage is below the battery check voltage;

a second transistor connected to the battery, not conducting when the battery voltage is greater than the battery check voltage, and conducting when the battery voltage is below the battery check voltage;

a first load circuit;

a second load circuit; and a selection switch connecting one of the first load circuit and the second load circuit to the battery when the second transistor is conducting.

9. A method for checking a voltage of a battery power source used in a device, comprising:

(a) determining a switch interval between a present time a switch is set to an ON state and a previous time the switch was set to an ON state;

(b) comparing the switch interval determined in step (a) with a predetermined time;

(c) checking the battery voltage according to the comparison performed in step (b).

10. A method for checking a voltage of a battery as recited in claim 9, wherein the step (b) of comparing comprises:

(b1) determining whether the switch interval is one of within the predetermined time and greater than the predetermined time;

(b2) connecting a first load to the battery when the switch interval is within the predetermined time; and (b3) connecting a second load to the battery when the switch interval is greater than the predetermined time.

11. A method for checking a voltage of a battery as recited in claim 10, wherein the step (c) of checking the battery voltage comprises:

(c1) comparing the battery voltage with a battery check voltage;

(c2) rendering the device operable when the battery voltage is above the battery check voltage; and (c3) rendering the device inoperable when the battery voltage is below the battery check voltage.

* * * * *